United States Patent
Fukuda

(10) Patent No.: US 7,110,639 B2
(45) Date of Patent: Sep. 19, 2006

(54) LIGHTWAVE CIRCUIT DEVICE

(75) Inventor: Chie Fukuda, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/141,211

(22) Filed: Jun. 1, 2005

(65) Prior Publication Data

US 2005/0276539 A1    Dec. 15, 2005

(30) Foreign Application Priority Data

Jun. 10, 2004    (JP)    ............... 2004-173093

(51) Int. Cl.
  *G02B 6/28*    (2006.01)
(52) U.S. Cl. ...................................... 385/24
(58) Field of Classification Search .............. None
  See application file for complete search history.

(56) References Cited

U.S. PATENT DOCUMENTS

| | | | |
|---|---|---|---|
| 6,185,345 B1 * | 2/2001 | Singh et al. ................... | 385/24 |
| 6,317,526 B1 * | 11/2001 | Shirasaki et al. ............... | 385/3 |
| 6,335,819 B1 * | 1/2002 | Cho et al. ................... | 359/333 |
| 2002/0015561 A1 * | 2/2002 | Kawashima et al. ........... | 385/42 |
| 2002/0081089 A1 * | 6/2002 | Min et al. ................... | 385/140 |
| 2004/0018017 A1 * | 1/2004 | Hatayama ................... | 398/43 |
| 2004/0146247 A1 * | 7/2004 | Tsai et al. ................... | 385/40 |

FOREIGN PATENT DOCUMENTS

JP    2003-149472 A    5/2003

OTHER PUBLICATIONS

Tsutomu Kitoh, Manabu Oguma, Yasuyuki Inoue, Tomohiro Shibata, Motohaya Ishii, and Yoshinori Hibino, C-3-125 Low-crosstalk 4-channel coarse WDM filter using silica-based planar-lightwave-circuit, Proceedings of the 2002 Institute of Electronics, Information and Communication Engineers General Conference, 2002, p. 257, Japan.

* cited by examiner

*Primary Examiner*—Sung Pak
*Assistant Examiner*—Chris Chu
(74) *Attorney, Agent, or Firm*—Global IP Counselors, LLP

(57) ABSTRACT

The present invention provides a lightwave circuit device, an optical multiplexer, and an optical demultiplexer with which light can be multiplexed or demultiplexed even when a plurality of lightwaves of varying wavelength are inputted. The lightwave circuit device includes first to third Mach-Zehnder interferometers. The first to third Mach-Zehnder interferometers each have first to third ports, a first optical coupler, first and second optical waveguides, a second optical coupler, and a first heater provided along at least one of the first and the second optical waveguides. The second port of the first Mach-Zehnder interferometer and the first port of the second Mach-Zehnder interferometer are optically coupled, and the third port of the first Mach-Zehnder interferometer and the first port of the third Mach-Zehnder interferometer are optically coupled.

4 Claims, 13 Drawing Sheets

LIGHTWAVE CIRCUIT DEVICE

BACKGROUND OF THE INVENTION

1. Field of the Invention

The present invention relates to a lightwave circuit device, an optical multiplexer, and an optical demultiplexer.

2. Description of the Related Art

As a lightwave circuit device, a coarse wavelength division multiplexing (CWDM) filter that makes use of a planar lightwave circuit (PLC) is disclosed is Kitoh et al., Proceedings of the 2002 IEICE General Conference, C-3-125 (2002), p. 257. With this CWDM filter, a plurality of lattice filters are disposed in tandem. This CWDM filter demultiplexes light of multiplexed wavelength into four lightwaves of different wavelengths.

As another lightwave circuit device, an optical multiplexer or optical demultiplexer in which a plurality of Mach-Zehnder interferometers are connected in a multistage tree is disclosed in Japanese Patent Application No. 2003-149472. Each of the Mach-Zehnder interferometers includes a first optical coupler, two optical waveguides connected to the first optical coupler, and a second optical coupler connected to the two optical waveguides. One of the two optical waveguides functions as a delay circuit.

The wavelengths of lightwaves multiplexed or demultiplexed by one of the above-mentioned lightwave circuit devices are predetermined for each of the lightwave circuit devices. If lightwaves whose wavelengths differ from the predetermined wavelengths are inputted to the above-mentioned lightwave circuit device, such lightwaves cannot be multiplexed. Similarly, if light in which lightwaves whose wavelengths differ from the predetermined wavelengths are multiplexed is inputted to the above-mentioned lightwave circuit device, it is impossible to demultiplex the light into individual lightwaves.

SUMMARY OF THE INVENTION

It is an object of the present invention to provide a lightwave circuit device, an optical multiplexer, and an optical demultiplexer with which light can be multiplexed or demultiplexed even when a plurality of lightwaves of varying wavelength are inputted.

To achieve the stated object, a lightwave circuit device having first to third Mach-Zehnder interferometers is provided. The first to third Mach-Zehnder interferometers each have first to third ports, a first optical coupler whose one end is optically coupled to the first port, first and second optical waveguides optically coupled to the other end of the first optical coupler, a second optical coupler optically coupled to each of the first and the second optical waveguides and the second and the third ports, and a first heater provided along at least one of the first and the second optical waveguides. The second port of the first Mach-Zehnder interferometer and the first port of the second Mach-Zehnder interferometer are optically coupled. The third port of the first Mach-Zehnder interferometer and the first port of the third Mach-Zehnder interferometer are optically coupled.

The lightwave circuit device preferably further includes a third optical coupler whose one end is optically coupled to the first port of the first Mach-Zehnder interferometer, third and fourth optical waveguides optically coupled to the other end of the third optical coupler, a fourth optical coupler whose one end is optically coupled to the third and the fourth optical couplers, fifth and sixth optical waveguides optically coupled to the other end of the fourth optical coupler, a fifth optical coupler whose one end is optically coupled to the fifth and the sixth optical waveguides, a second heater provided along at least one of the third and the fourth optical waveguides, and a third heater provided along at least one of the fifth and the sixth optical waveguide. In this case, the lightwave circuit device preferably further includes a fourth port optically coupled to the third optical coupler.

In addition, there is provided an optical multiplexer in which a plurality of first input ports to which a plurality of lightwaves of mutually different wavelengths are inputted, an optical multiplexing circuit (which is the lightwave circuit device of the present invention) that multiplexes the plurality of lightwaves and outputs a first signal light, a second input port to which a second signal light including a lightwave with a different wavelength from the wavelengths of the plurality of lightwaves of the first signal light is inputted, and an output port to which the first and the second signal lights are outputted, are provided on a substrate. The second and the third ports of each of the second and the third Mach-Zehnder interferometers are optically coupled to the plurality of first input ports.

There is further provided an optical demultiplexer in which an input port to which a first signal light including a plurality of lightwaves of mutually different wavelengths and a second signal light including a lightwave having a different wavelength from those of the plurality of lightwaves are inputted, an optical demultiplexing circuit (which is the lightwave circuit device of the present invention) that demultiplexes the first signal light, a first output port to which the second signal light is outputted, and a plurality of second output ports to which each of the plurality of lightwaves that are included in the first signal light and demultiplexed by the optical demultiplexing circuit is outputted, are provided on a substrate. The second and the third ports of each of the second and the third Mach-Zehnder interferometers are optically coupled to the plurality of second output ports.

Advantage of the present invention will become apparent from the following detailed description, which illustrates the best mode contemplated to carry out the invention. The invention is capable of other and different embodiments, the details of which are capable of modifications in various obvious respects, all without departing from the invention. Accordingly, the accompanying drawings and description are illustrative in nature, not restrictive.

BRIEF DESCRIPTION OF THE DRAWINGS

The present invention is illustrated by way of example, and not by way of limitation, in the figures of the accompanying drawings in which like reference numbers refer to similar elements.

DESCRIPTION OF THE PREFERRED EMBODIMENTS

First Embodiment

Figure 1:
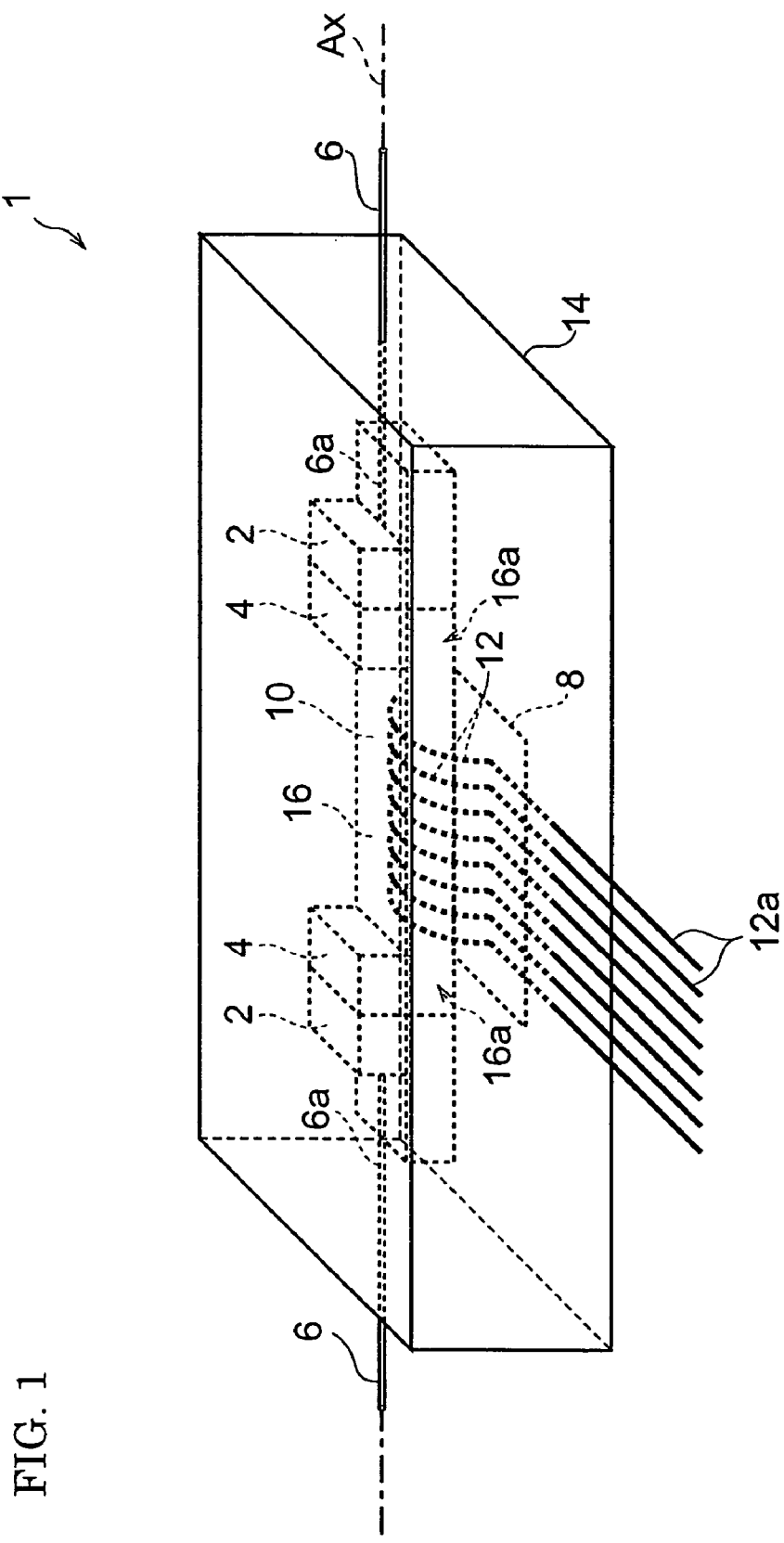
FIG. 1 is a schematic diagram of an optical module equipped with the lightwave circuit device according to the present invention.

FIG. 1 is a schematic diagram of an optical module 1 equipped with the lightwave circuit device according to the present invention. The optical module 1 is used, for example, in a CWDM system or a dense wavelength division multiplexing (DWDM) system.

The lightwave circuit device 10 of the first embodiment is, for example, a planar waveguide type element made of a silica-based material, and has a substrate 16 made of a silica-based material, for example. Optical waveguides, optical couplers, Mach-Zehnder interferometers, optical switches, and the like are provided to the substrate 16. Therefore, it can be said that lightwave circuits are integrated on the substrate 16 in the lightwave circuit device 10. Optical fiber arrays 2 are connected at both ends 16a of the substrate 16. A reinforcing member 4 is provided on the surface of the substrate 16 at both ends 16a, and the reinforcing members 4 are also connected to the optical fiber arrays 2. The ends 6a of optical fibers 6 are fixed to the optical fiber arrays 2. The optical axes of the lightwave circuits and the optical fibers 6 are aligned.

A plurality of wires 12 are electrically connected to the surface of the substrate 16. The other ends of the wires 12 are fixed to a wiring board 8 so as to form terminals 12a. A control unit equipped with electrical circuits for controlling the lightwave circuit device 10 can be connected to the terminals 12a. The lightwave circuit device 10, the reinforcing members 4, the optical fiber arrays 2, the wires 12, the wiring board 8, and the ends 6a of the optical fibers 6 are covered with a molding 14 made of resin, for example. The terminals 12a project outward from the molding 14.

Figure 2:
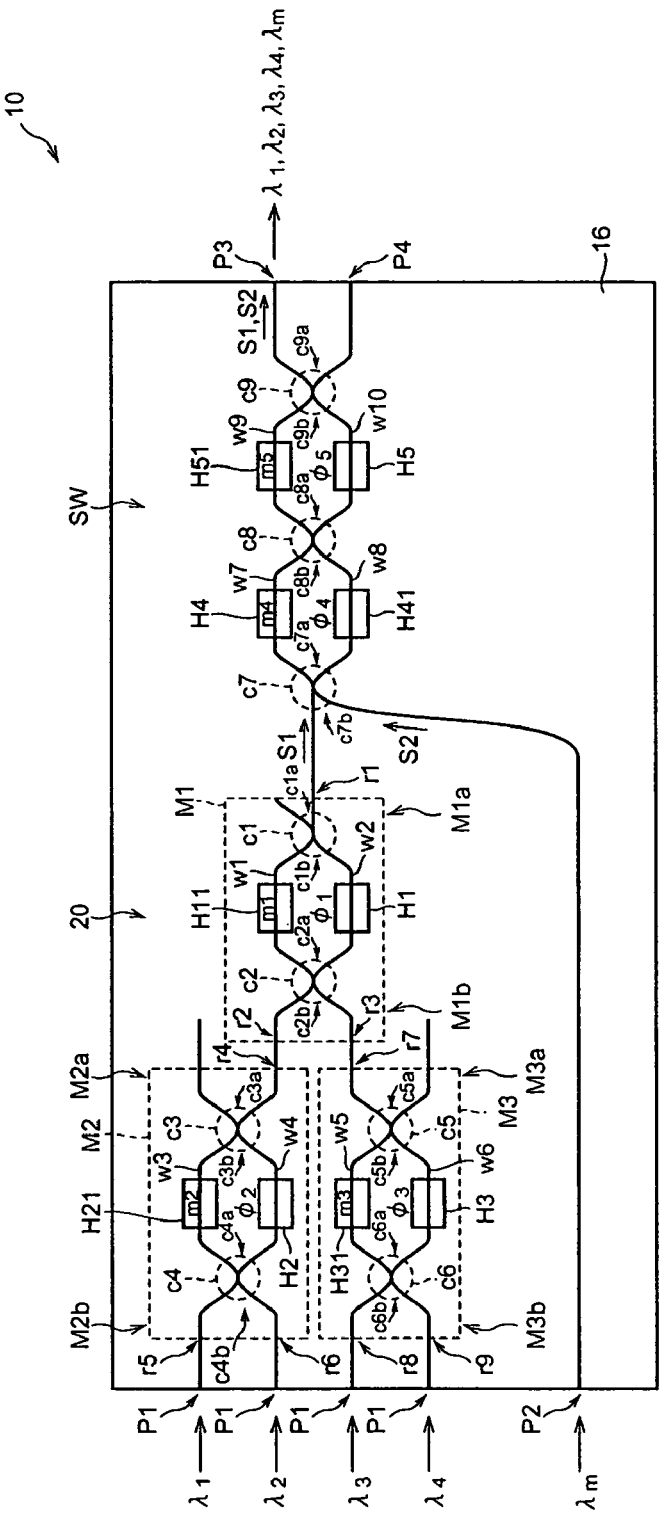
FIG. 2 is a schematic diagram of a first embodiment pertaining to the lightwave circuit device according to the present invention.

FIG. 2 is a schematic diagram of a first embodiment pertaining to the lightwave circuit device according to the present invention. The lightwave circuit device 10 of the first embodiment has an optical multiplexing circuit 20, and functions as an optical multiplexer. The optical multiplexing circuit 20 includes first to third Mach-Zehnder interferometers M1 to M3 provided to the substrate 16.

A first port r1 is provided to one end M1a of the Mach-Zehnder interferometer M1, and a second port r2 and a third port r3 are provided to the other end M1b. One end C1a of a first optical coupler C1 is optically coupled to the port r1. A first optical waveguide (also called an arm) w1 and a second optical waveguide w2 are optically coupled to the other end C1b of the optical coupler C1. One end C2a of a second optical coupler C2 is optically coupled to the optical waveguides w1 and w2. The ports r2 and r3 are optically coupled to the other end C2b of the optical coupler C2. First heaters H11 and H1 are provided to the optical waveguides w1 and w2, respectively.

A first port r4 is provided to one end M2a of the Mach-Zehnder interferometer M2, and a second port r5 and a third port r6 are provided to the other end M2b. A first port r7 is provided to one end M3a of the Mach-Zehnder interferometer M3, and a second port r8 and a third port r9 are provided to the other end M3b. The internal structure of the Mach-Zehnder interferometer M2 and the Mach-Zehnder interferometer M3 is the same as the internal structure of the Mach-Zehnder interferometer M1. The port r2 of the Mach-Zehnder interferometer M1 is optically coupled to the port r4 of the Mach-Zehnder interferometer M2. The port r3 of the Mach-Zehnder interferometer M1 is optically coupled to the port r7 of the Mach-Zehnder interferometer M3.

The lightwave circuit device 10 is also equipped with four first input ports P1 to which a plurality of lightwaves having mutually different wavelengths $\lambda_1$, $\lambda_2$, $\lambda_3$, and $\lambda_4$ are inputted. The ports r5, r6, r8, and r9 of the Mach-Zehnder interferometers M2 and M3 are optically coupled to the input ports P1 via optical waveguides. When lightwaves having the wavelengths $\lambda_1$, $\lambda_2$, $\lambda_3$, and $\lambda_4$ are inputted to the input ports P1, these lightwaves are inputted to the ports r5, r6, r8, and r9, respectively. The optical multiplexing circuit 20 multiplexes the lightwaves inputted to the ports r5, r6, r8, and r9, and outputs a first signal light S1 in which lightwaves having the wavelengths $\lambda_1$, $\lambda_2$, $\lambda_3$, and $\lambda_4$ are multiplexed from the port r1 of the Mach-Zehnder interferometer M1.

In the Mach-Zehnder interferometers M1 to M3, heaters H1, H11, H2, H21, H3, and H31 are provided along the optical waveguides. These heaters are electrically connected to the respective wires 12 (FIG. 1). By applying a desired voltage to the terminals 12a, the refractive index of the heated portion of the optical waveguides w2, w1, w4, w3, w6, and w5 can be adjusted. As a result, the phase differential $\phi_1$ between lightwaves passing through the optical waveguides w2 and w1, the phase differential $\phi_2$ between lightwaves passing through the optical waveguides w4 and w3, and the phase differential $\phi_3$ between lightwaves passing through the optical waveguides w6 and w5 can each be controlled. An alternate configuration is possible in which the phase differentials $\phi_1$, $\phi_2$, and $\phi_3$ are controlled by providing only the heaters H1, H2, and H3, or in which the phase differentials $\phi_1$, $\phi_2$, and $\phi_3$ are controlled by providing only the heaters H11, H21, and H31.

Therefore, even when the wavelengths $\lambda_1$, $\lambda_2$, $\lambda_3$, and $\lambda_4$ of lightwaves inputted to the lightwave circuit device 10 vary, by setting desired phase differentials $\phi_1$, $\phi_2$, and $\phi_3$, it is possible to multiplex a plurality of lightwaves that have wavelength intervals determined by the phase differentials and a differential order. For instance, when using a plurality of lightwaves whose wavelengths are entirely shifted from the wavelengths $\lambda_1$, $\lambda_2$, $\lambda_3$, and $\lambda_4$ to the long or short wavelength side, the plurality of lightwaves can still be multiplexed by the lightwave circuit device 10. The manner in which the phase differential is controlled will be described in detail below.

The lightwave circuit device 10 preferably includes an optical switch SW on the substrate 16. The optical switch SW has a third optical coupler C7, and the port r1 of the Mach-Zehnder interferometer M1 is optically coupled via an optical waveguide to one end C7b of the optical coupler C7. Third and fourth optical waveguides w7 and w8 are optically coupled to the other end C7a of the optical coupler C7. One end C8b of a fourth optical coupler C8 is optically coupled to the optical waveguides w7 and w8. Fifth and sixth optical waveguides w9 and w10 are optically coupled to the other end C8a of the optical coupler C8. One end C9b of a fifth optional coupler C9 is optically coupled to the optical waveguides w9 and w10. Second heaters H4 and H41 are provided along the optical waveguides w7 and w8, respectively. Third heaters H51 and H5 are provided along the optical waveguides w9 and w10, respectively.

When the lightwave circuit device 10 is equipped with the optical switch SW, a phase differential $\phi_4$ between lightwaves passing through the optical waveguides w7 and w8 and a phase differential $\phi_5$ between lightwaves passing through the optical waveguides w10 and w9 can be controlled by the heaters H4, H41, H5, and H51. As a result, it is possible to switch the path of the signal light passing through the optical couplers C7, C8, and C9 and the optical waveguides w7 to w10. Alternatively, the phase differentials $\phi_4$ and $\phi_5$ may be controlled by providing only the heaters H4 and H5, or the phase differentials $\phi_4$ and $\phi_5$ may be controlled by providing only the heaters H41 and H51.

In the lightwave circuit device 10 that is equipped with the optical switch SW, the heaters H1, H11, H2, H21, H3, H31, H4, H41, H5, and H51 can all be controlled together. That is, the optical multiplexing circuit 20 and the optical switch SW can be controlled simultaneously. This improves control over the signal light passing through the lightwave circuit device 10. Furthermore, since the optical switch SW is provided to the substrate 16, the lightwave circuit device 10 is more compact and less expensive.

The lightwave circuit device 10 preferably includes a second input port P2 (fourth port) that is optically coupled via an optical waveguide to one end C7b of the optical coupler C7 on the side of the port r1. The input port P2 is provided to the substrate 16. In this case, for example, a second signal light S2 including monitoring light having a wavelength of $\lambda_m$ that is different from any of the wavelengths $\lambda_1$, $\lambda_2$, $\lambda_3$, and $\lambda_4$ can be inputted to the input port P2.

Output ports P3 and P4 are optically coupled via optical waveguides to the other end C9a of an optical coupler C9 which is on the opposite side from the optical waveguides w9 and w10. The signal lights S1, S2 can be outputted to either of the output ports P3 and P4 as desired by controlling the heater of the optical switch SW.

A specific example of the lightwave circuit device 10 will now be described. In this specific example, the optical waveguides w1 to w10 include a core and a cladding that covers the core. The cladding is composed of overcladding and undercladding. The optical couplers C1 to C9 are optical directional couplers. The heaters are thin-film resistors provided on the surface of the overcladding of the optical waveguide. The use of a heater allows the refractive index of the core and cladding to be changed.

As for waveguide parameters, a specific refractive index differential $\Delta n$ for the core to the cladding is 1.5% and the core size is 4.5×4.5 μm. As for the lightwave circuit parameters, a diffraction order $m_1$ of the optical waveguide w1 when the wavelength is $\lambda_0$ is 18.85, a diffraction order $m_2$ of the optical waveguide w3 is 9.425, a diffraction order $m_3$ of the optical waveguide w5 is 9.175, a diffraction order $m_4$ for the optical waveguide w7 is 37.7, and a diffraction order $m_5$ of the optical waveguide w9 is −75.4. The coupling coefficients k1, k2, . . . , k7 of the optical couplers C1, C2, . . . , C7 are each 0.5, the coupling coefficient k8 of the fourth optical coupler C8 is 0.3, and the coupling coefficient k9 of the fifth optical coupler C9 is 0.1.

The effective refractive index $n_{eff}$ and the arm length differentials $\Delta L_1$, $\Delta L_2$, $\Delta L_3$, $\Delta L_4$, and $\Delta L_5$, which are obtained by subtracting the length of the optical waveguides w2, w4, w6, w8, and w10 from the length of the optical waveguides w1, w3, w5, w7, and w9 satisfy the following equation:

$$n_{eff} \times L_i = \lambda_0 \times m_i (i=1, 2, 3, 4, 5) \qquad (1)$$

The heaters H1, H11, H2, H21, H3, and H31 are used to control the phase differentials $\phi_1$, $\phi_2$, and $\phi_3$ to be 45°, 22.5°, and 22.5°, respectively. Here, the phase differential is expressed as a positive value when the phase of the light passing through the optical waveguides w2, w4, and w6 is delayed compared to the phase of the light passing through the optical waveguides w1, w3, and w5.

Figure 3:
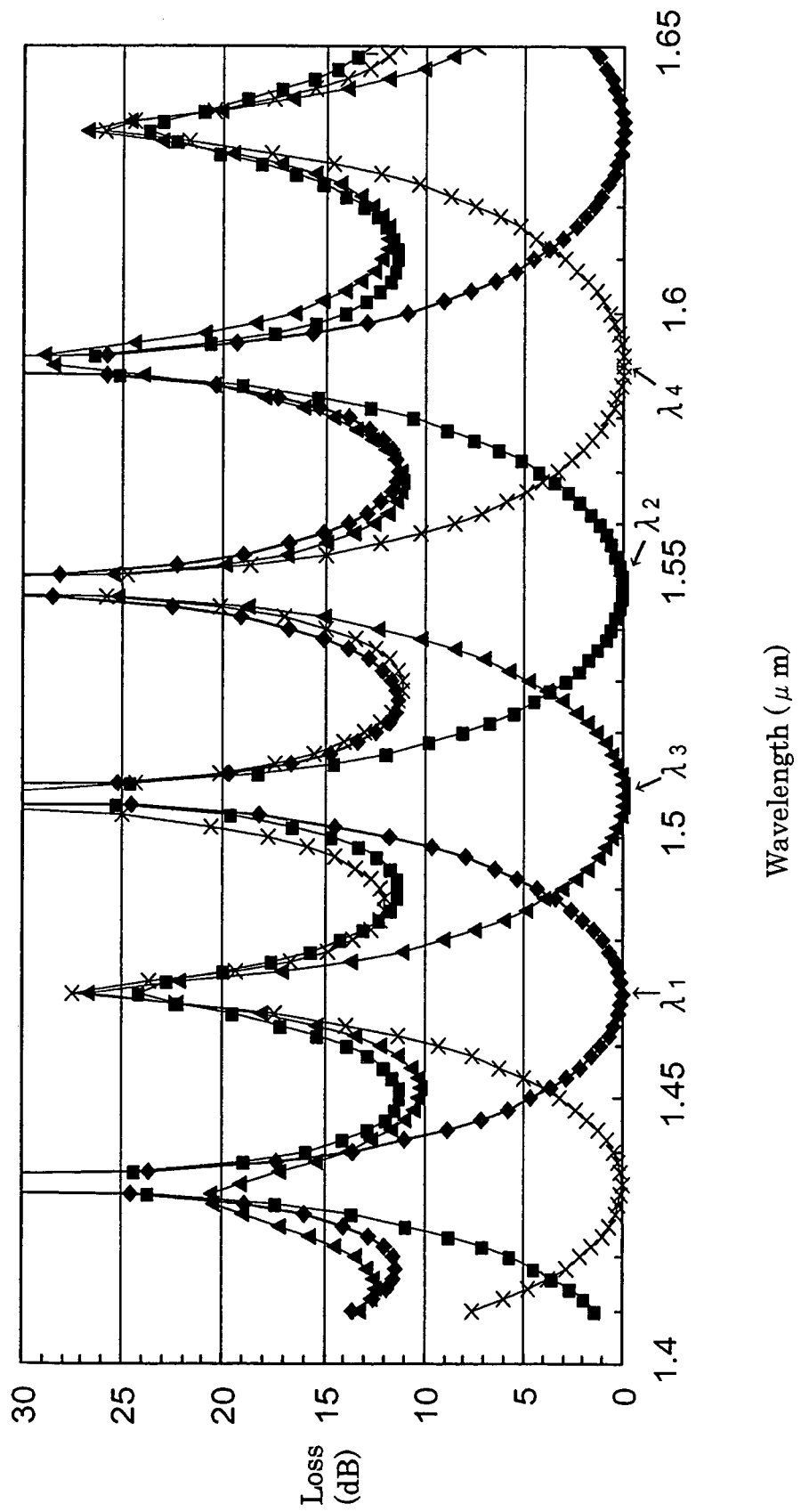
FIG. 3 is a graph illustrating an example of the transmission spectrum of light traveling from four input ports P1 to a port r1 in the lightwave circuit device of the first embodiment.

FIG. 3 is a graph illustrating an example of the transmission spectrum of light traveling from the four input ports P1 to the port r1 in the lightwave circuit device of the first embodiment. The horizontal axis of the graph indicates the wavelength of the light, while the vertical axis indicates the loss (dB). The symbols "♦", "▲", "■", and "x" each indicate the transmission spectrum of lightwaves passing through r5, r6, r8, and r9, respectively. The wavelengths $\lambda_1$, $\lambda_2$, $\lambda_3$, and $\lambda_4$ that give the minimum loss in each transmission spectrum are 1470 nm, 1550 nm, 1510 nm, and 1590 nm, respectively. Therefore, lightwaves that have wavelengths of 1470 nm, 1550 nm, 1510 nm, and 1590 nm and pass through r5, r6, r8, and r9 are multiplexed, and are outputted as the wavelength division multiplexed signal light S1 from the port r1.

Figure 4A:
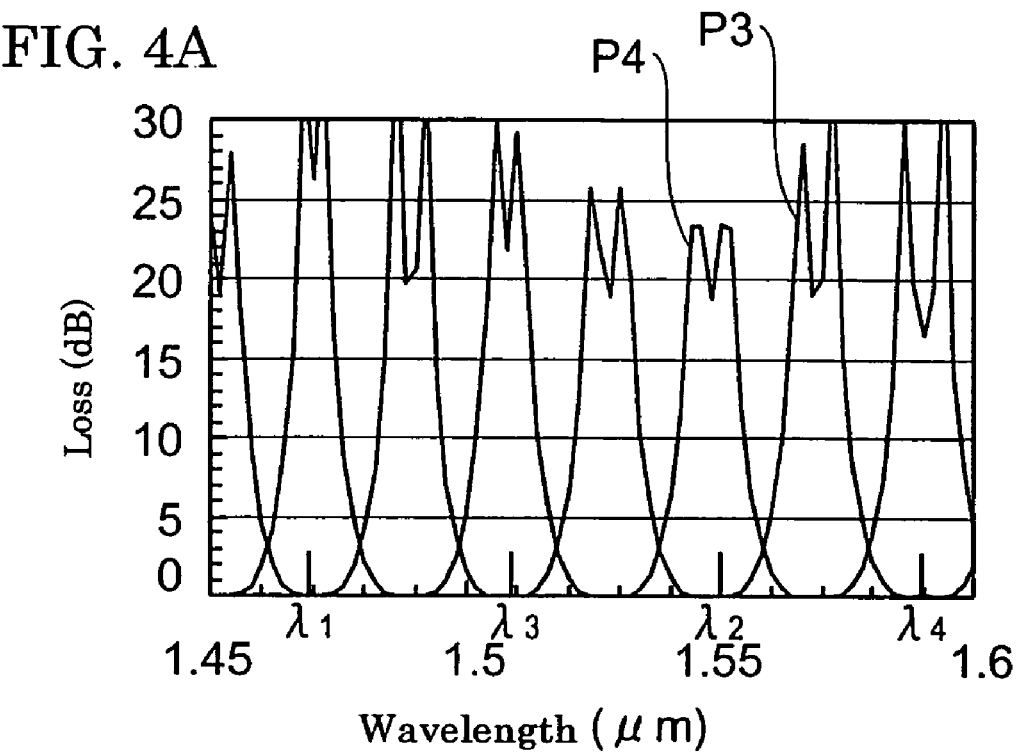
FIGS. 4A and 4B are graphs illustrating an example of the transmission spectrum of light traveling from the port r1 to an output port P3 or P4 in the lightwave circuit device of the first embodiment, with FIG. 4A being when a switch is set to output the signal light S1 to the output port P3, and FIG. 4B being when the switch is set to output the signal light S1 to the output port P4.
Figure 4B:
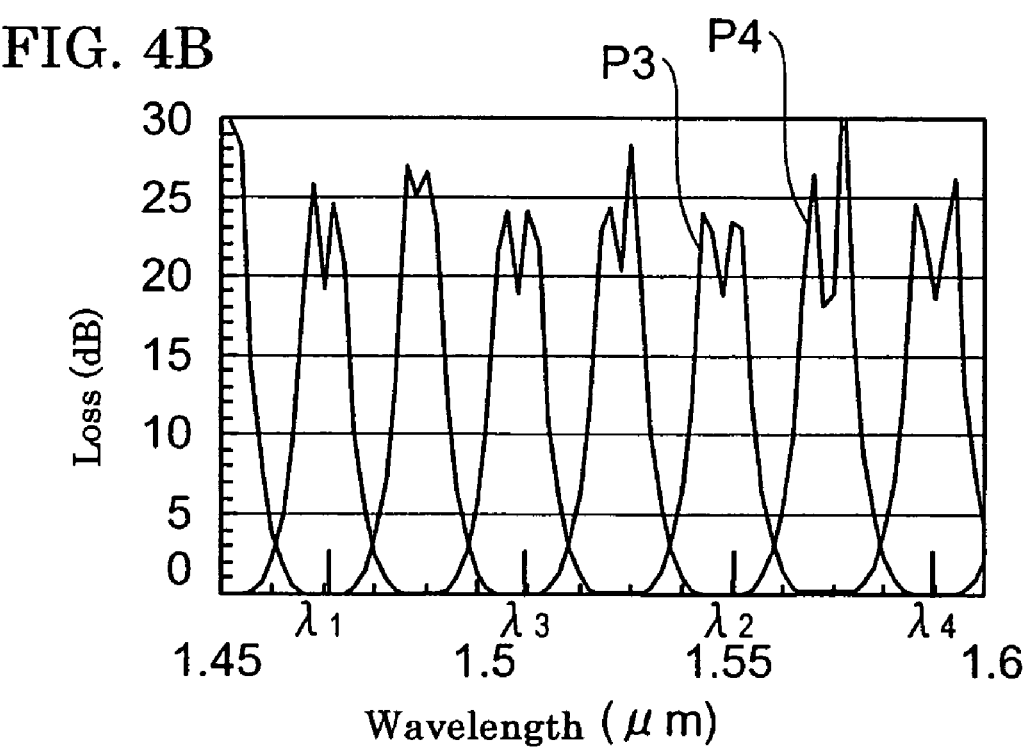

FIGS. 4A and 4B are graphs illustrating an example of the transmission spectrum of light traveling from the port r1 to the output port P3 or P4 in the lightwave circuit device of the first embodiment. The horizontal axis of the graph indicates the wavelength of the light, while the vertical axis indicates the loss (dB).

FIG. 4A illustrates the case when a switch is set to output the signal light S1 to the output port P3, where the heaters H4, H41, H5, and H51 are used to control the phase differentials $\phi_4$ and $\phi_5$ to be −90° and 180°, respectively. Here, the phase differential is expressed as a positive value when the phase of the light passing through the optical waveguides w8 and w10 is delayed compared to the phase of the light passing through the optical waveguides w7 and w9. The spectrum indicated as P3 is the transmission spectrum of light traveling from the port r1 to the output port P3, and the spectrum indicated as P4 is the transmission spectrum of light traveling from the port r1 to the output port P4. The loss at the wavelengths $\lambda_1$, $\lambda_2$, $\lambda_3$, and $\lambda_4$ is the minimum in the spectrum P3.

FIG. 4B illustrates the case when the switch is set to output the signal light S1 to the output port P4, where the phase differentials $\phi_4$ and $\phi_5$ are controlled to be −90° and 180°, respectively. The spectrum indicated as P3 is the transmission spectrum of light traveling from the port r1 to the output port P3, and the spectrum indicated as P4 is the transmission spectrum of light traveling from the port r1 to the output port P4. The loss at the wavelengths $\lambda_1$, $\lambda_2$, $\lambda_3$, and $\lambda_4$ is the minimum in the spectrum P4.

Thus, the signal lights S1, S2 can be outputted to either of the output ports P3 and P4 as desired by controlling the heaters H4, H41, H5, and H51. Accordingly, the heaters H4, H41, H5, and H51, the optical couplers C7, C8, and C9, and the optical waveguides w7 to w10 function as the optical switch SW. Furthermore, the optical switch SW suppresses cross-talk between adjacent lightwaves among the lightwaves having the wavelength $\lambda_1$, $\lambda_2$, $\lambda_3$, and $\lambda_4$. Therefore, with the lightwave circuit device 10 equipped with an optical switch SW, there is no need to add a separate filter circuit for suppressing cross-talk, and the lightwave circuit device 10 that is more compact and less expensive can be obtained.

Second Embodiment

Figure 5:
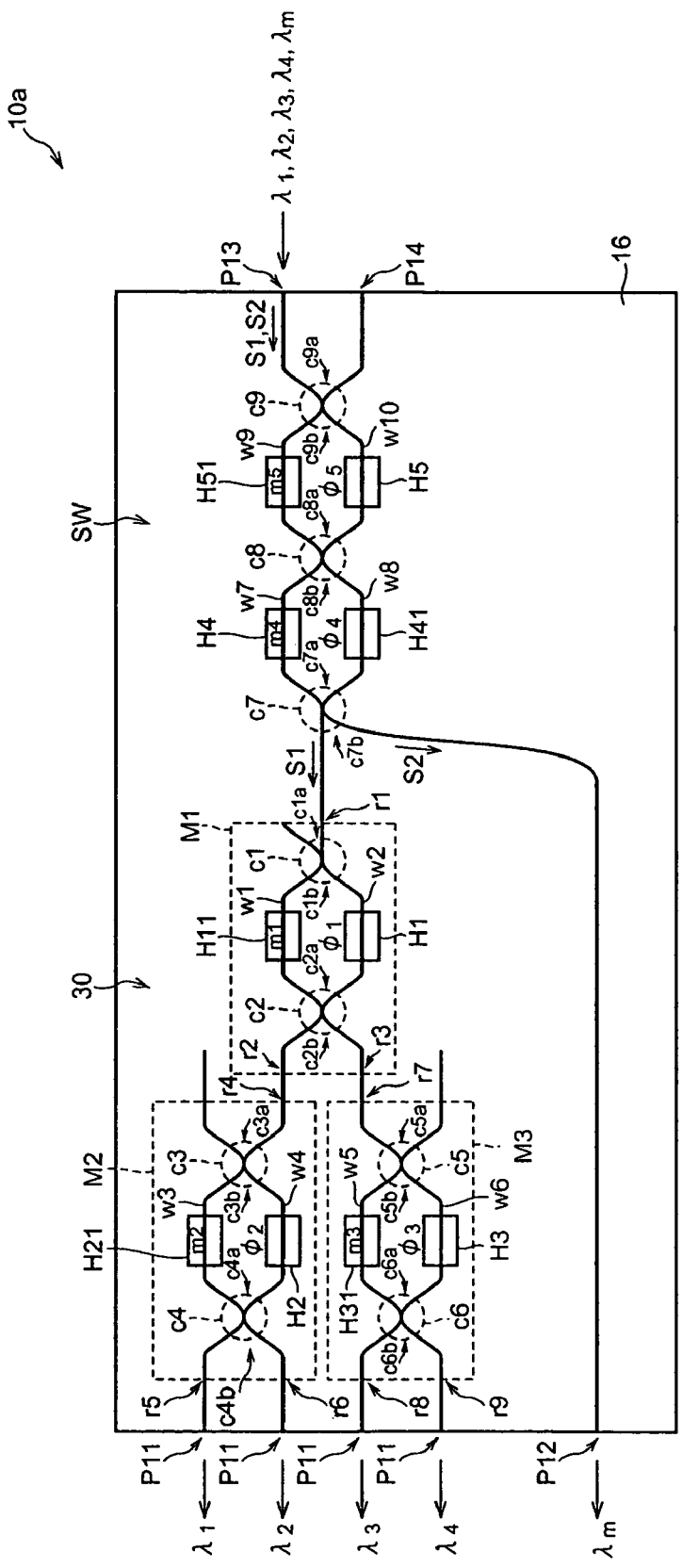
FIG. 5 is a schematic diagram of a second embodiment pertaining to the lightwave circuit device according to the present invention.

FIG. 5 is a schematic diagram of a second embodiment pertaining to the lightwave circuit device according to the present invention. A lightwave circuit device 10a in this second embodiment is, for example, a planar waveguide type lightwave circuit device made of a silica-based material. The lightwave circuit device 10a has an optical demultiplexing circuit 30 and functions as an optical demultiplexer. The optical demultiplexing circuit 30 includes Mach-Zehnder interferometers M1, M2, and M3 provided to a substrate 16. The port r2 of the Mach-Zehnder interferometer M1 is optically coupled to the port r4 of the Mach-Zehnder interferometer M2. The port r3 of the Mach-Zehnder interferometer M1 is optically coupled to the port r7 of the Mach-Zehnder interferometer M3.

The lightwave circuit device 10a preferably includes an optical switch SW that is optically coupled to the port r1 of the Mach-Zehnder interferometer M1. Input ports P13 and P14 are optically coupled via optical waveguides to one end C9a of the optical coupler C9 of the optical switch SW. A first output port P12 (fourth port) that is provided to the substrate 16 is optically coupled via an optical waveguide to one end C7b of the optical coupler C7 of the optical switch SW. A plurality of second output ports P11 are optically coupled via optical waveguides to the ports r5, r6, r8, and r9 of the Mach-Zehnder interferometers M2 and M3.

In the lightwave circuit device 10a, a first signal light S1 in which a plurality of lightwaves having mutually different wavelengths $\lambda_1$, $\lambda_2$, $\lambda_3$, and $\lambda_4$ are multiplexed, and a second signal light S2 including a monitoring light $\lambda_m$ are inputted to the input port P13. The signal light S1 and the signal light S2 are inputted to the optical switch SW, and the signal light S1 and the signal light S2 are separated from one another by controlling the heater of this optical switch SW. The signal light S1 is inputted to the optical demultiplexing circuit 30, and is demultiplexed into a plurality of lightwaves of wavelengths $\lambda_1$, $\lambda_2$, $\lambda_3$, and $\lambda_4$ by the optical demultiplexing circuit 30. As a result, lightwaves of the wavelengths $\lambda_1$, $\lambda_2$, $\lambda_3$, and $\lambda_4$ included in the signal light S1 are separately outputted from the four output ports P11. Meanwhile, the signal light S2 is outputted as the monitoring light $\lambda_m$ from the output port P12.

With each of the Mach-Zehnder interferometers M1 to M3 here, a heater is provided along at least one of the optical waveguides. With the lightwave circuit device 10a equipped with these Mach-Zehnder interferometers M1 to M3, the heaters H1, H11, H2, H21, H3, and H31 can be used to control the phase differentials $\phi_1$, $\phi_2$, and $\phi_3$ in the Mach-Zehnder interferometers M1 to M3. Therefore, with the lightwave circuit device 10a, even if the wavelengths of the lightwaves $\lambda_1$, $\lambda_2$, $\lambda_3$, and $\lambda_4$ included in the signal light S1 are changed, by setting the desired phase differentials $\phi_1$, $\phi_2$, and $\phi_3$, it is possible to demultiplex the signal light including the plurality of lightwaves if they have wavelength intervals determined by the phase differentials and a differential order.

Figure 6:
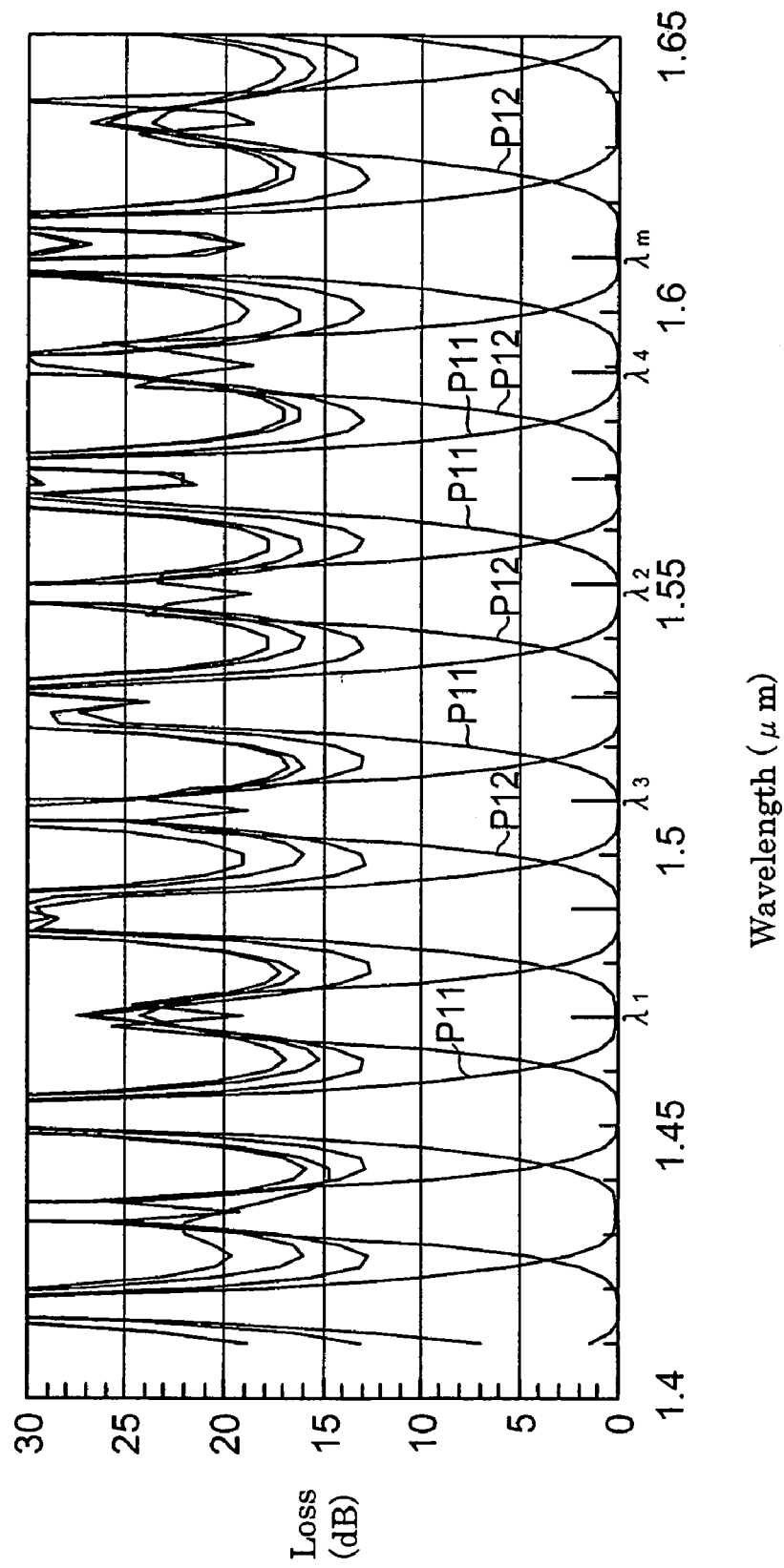
FIG. 6 is a graph illustrating an example of the transmission spectrum of light traveling from an input port P13 to output ports P11 and P12 in the lightwave circuit device of the second embodiment.

A specific example of the lightwave circuit device 10a will now be described. FIG. 6 is a graph illustrating an example of the transmission spectrum of light traveling from an input port P13 to output ports P11 and P12 in the lightwave circuit device of the second embodiment. The horizontal axis of the graph indicates the wavelength of the light, while the vertical axis indicates the loss (dB). The spectrum indicated as P11 is the spectrum of light traveling from the input port P13 to the output port P11, and the spectrum indicated as P12 is the spectrum of light traveling from the input port P13 to the output port P12.

In this example, the wavelength $\lambda_m$ of the monitoring light is set at 1610 nm. The values of the wavelengths $\lambda_1$, $\lambda_2$, $\lambda_3$, and $\lambda_4$, the optical waveguide parameters, and the lightwave circuit parameters are all the same as in the first embodiment. It can be seen from the graph of FIG. 6 that the loss is the minimum at the wavelengths $\lambda_1$, $\lambda_2$, $\lambda_3$, and $\lambda_4$ at the output port P11. Thus, lightwaves having wavelengths of $\lambda_1$, $\lambda_2$, $\lambda_3$, and $\lambda_4$ are each outputted from the output ports P11. Meanwhile, it can be seen that the loss is the minimum at the wavelength $\lambda_m$ at the output port P12. Also, at the output port P12, the loss is the minimum when the wavelength is 1470 nm, 1530 nm, or 1570 nm. Therefore, the wavelength $\lambda_m$ of the monitoring light may be set at 1470 nm, 1530 nm, or 1570 nm. Thus, with the lightwave circuit device 10a, signal light including a plurality of mutually different lightwaves, a monitoring light, or the like can be used as the second signal light.

Third Embodiment

Figure 7:
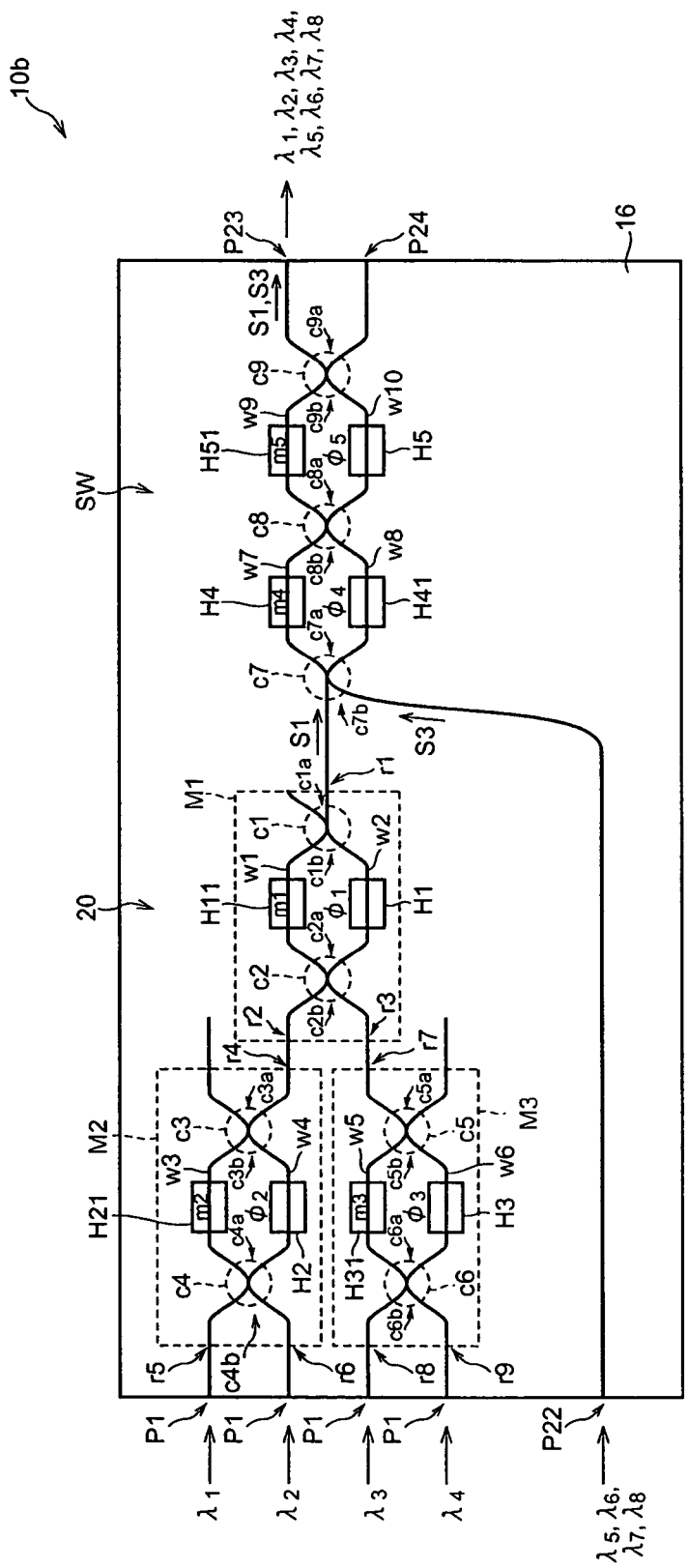
FIG. 7 is a schematic diagram of a third embodiment pertaining to the lightwave circuit device according to the present invention.

FIG. 7 is a schematic diagram of a third embodiment pertaining to the lightwave circuit device according to the present invention. A lightwave circuit device 10b of this third embodiment is, for example, a planar waveguide type lightwave circuit device made of a silica-based material. The lightwave circuit device 10b has an optical multiplexing circuit 20 provided to a substrate 16, and functions as an optical multiplexer. The lightwave circuit device 10b includes four first input ports P1 to which lightwaves having a plurality of mutually different wavelengths $\lambda_1$, $\lambda_2$, $\lambda_3$, and $\lambda_4$ are inputted. Also, the lightwave circuit device 10b preferably includes an optical switch SW that is optically coupled via an optical waveguide to the port r1 of the Mach-Zehnder interferometer M1.

A second input port P22 (fourth port) provided to the substrate 16 is optically coupled via an optical waveguide to one end C7b, which is on the side of the port r1, of the optical coupler C7 of the optical switch SW. In this case, a second signal light S3 including a plurality of lightwaves having mutually different wavelengths $\lambda_5$, $\lambda_6$, $\lambda_7$, and $\lambda_8$ can be inputted to the input port P22, for example. The wavelengths $\lambda_5$, $\lambda_6$, $\lambda_7$, and $\lambda_8$ are all different from the wavelength $\lambda_1$, $\lambda_2$, $\lambda_3$, and $\lambda_4$.

Output ports P23 and P24 are optically coupled via optical waveguides to one end C9a of the optical coupler C9 of the optical switch SW. When the optical switch SW is used, the signal lights S1, S3 can be outputted from either of the output ports P23 and P24 as desired.

With each of the Mach-Zehnder interferometers M1 to M3 here, a heater is provided along at least one of the optical waveguides. With a lightwave circuit device 10b thus equipped with the Mach-Zehnder interferometers M1 to M3, the phase differentials $\phi_1$, $\phi_2$, and $\phi_3$ in the Mach-Zehnder interferometers M1 to M3 can be controlled by using the heaters H1, H11, H2, H21, H3, and H31. Therefore, with the lightwave circuit device 10b, just as with the lightwave circuit device 10, even if the wavelengths of the lightwaves $\lambda_1$, $\lambda_2$, $\lambda_3$, and $\lambda_4$ are changed, by setting the desired phase differentials $\phi_1$, $\phi_2$, and $\phi_3$, it is possible to multiplex a plurality of lightwaves having wavelength intervals determined by the phase differentials and a diffraction order.

Fourth Embodiment

Figure 8:
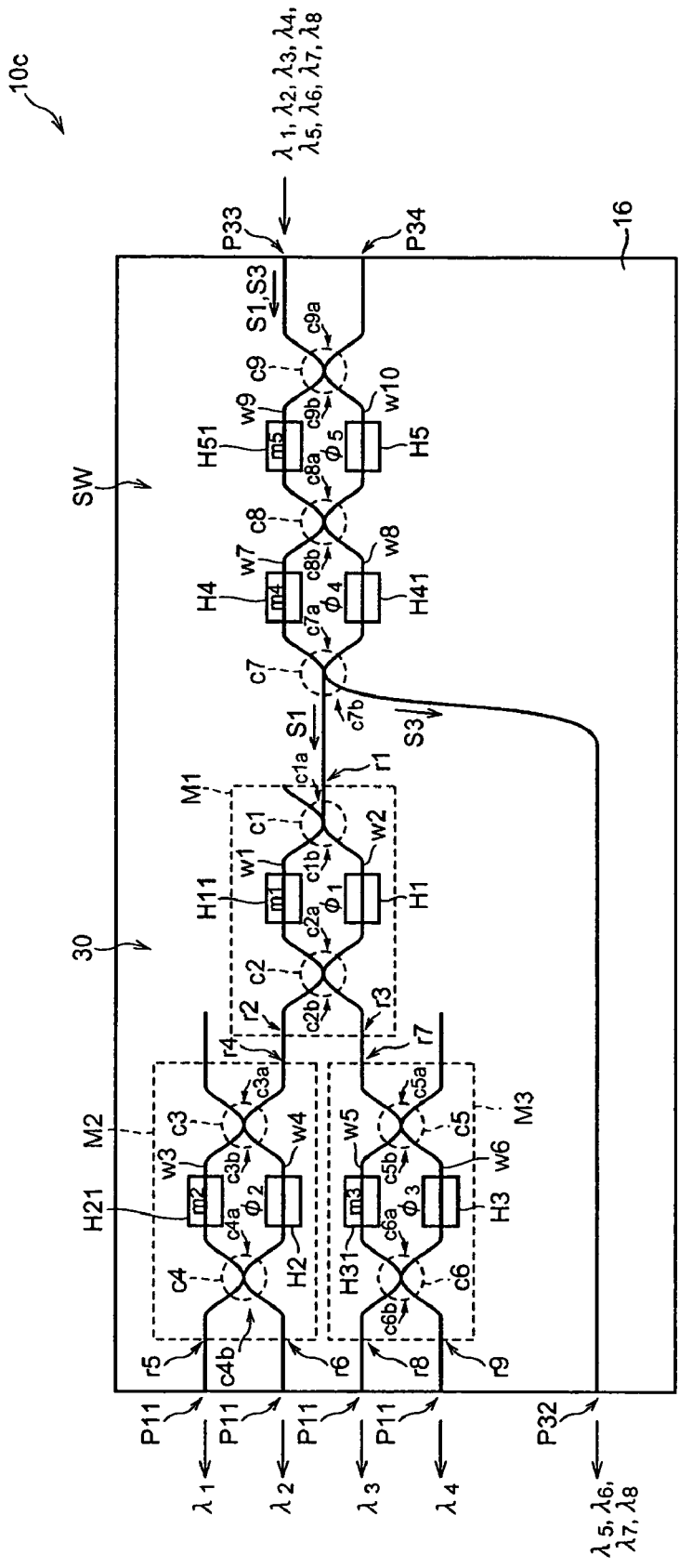
FIG. 8 is a schematic diagram of a fourth embodiment pertaining to the lightwave circuit device according to the present invention.

FIG. 8 is a schematic diagram of a fourth embodiment pertaining to the lightwave circuit device according to the present invention. A lightwave circuit device 10c of this fourth embodiment is, for example, a planar waveguide type lightwave circuit device made of a silica-based material. The lightwave circuit device 10c has an optical demultiplexing circuit 30, and functions as an optical demultiplexer.

The lightwave circuit device 10c preferably includes an optical switch SW that is optically coupled to the port r1 of the Mach-Zehnder interferometer M1. Input ports P33 and P34 are optically coupled via optical waveguides to one end C9a of the optical coupler C9 of the optical switch SW. A first output port P32 (fourth port) provided to a substrate 16 is optically coupled via an optical waveguide to one end C7b, which is on the side of the port r1, of the optical coupler C7 of the optical switch SW.

With this fourth embodiment, the signal lights S1 and S3 are inputted to the input port P33 and then inputted to the optical switch SW. The signal light S1 includes lightwaves having wavelengths of $\lambda_1$, $\lambda_2$, $\lambda_3$, and $\lambda_4$, while the signal light S3 includes lightwaves having wavelengths of $\lambda_5$, $\lambda_6$, $\lambda_7$, and $\lambda_8$ that are all different from the wavelengths $\lambda_1$, $\lambda_2$, $\lambda_3$, and $\lambda_4$. The signal lights S1 and S3 are separated by the optical switch SW into the signal light S1 and the signal light S3. Under a predetermined phase differentials $\phi_4$ and $\phi_5$ of the optical switch SW, the signal light S1 is inputted to the optical demultiplexing circuit 30 and demultiplexed into a plurality of lightwaves having the wavelengths $\lambda_1$, $\lambda_2$, $\lambda_3$, and $\lambda_4$, which are separately outputted from the output ports P11. Meanwhile, the signal light S3 is outputted from the output port P32. The signal lights S1, S3 may instead be inputted to the input port P34. In this case, the signal light S3 is demultiplexed by the optical demultiplexing circuit 30 by adjusting the phase differentials $\phi_1$, $\phi_2$, and $\phi_3$, and outputted separately from the output ports P11. Meanwhile, the signal light S1 is outputted from the output port P32.

With each of the Mach-Zehnder interferometers M1 to M3 here, a heater is provided along at least one of the optical waveguides. With a lightwave circuit device 10c equipped with these Mach-Zehnder interferometers M1 to M3, the heaters H1, H11, H2, H21, H3, and H31 can be used to control the phase differentials $\phi_1$, $\phi_2$, and $\phi_3$ in the Mach-Zehnder interferometers M1 to M3. Therefore, with the lightwave circuit device 10c, just as with the lightwave circuit device 10a, even if the wavelengths of the lightwaves $\lambda_1$, $\lambda_2$, $\lambda_3$, and $\lambda_4$ included in the signal light S1 are changed, by setting the desired phase differentials $\phi_1$, $\phi_2$, and $\phi_3$, it is possible to demultiplex signal light including a plurality of lightwaves having wavelength intervals determined by the phase differentials and differential order.

Figure 9A:
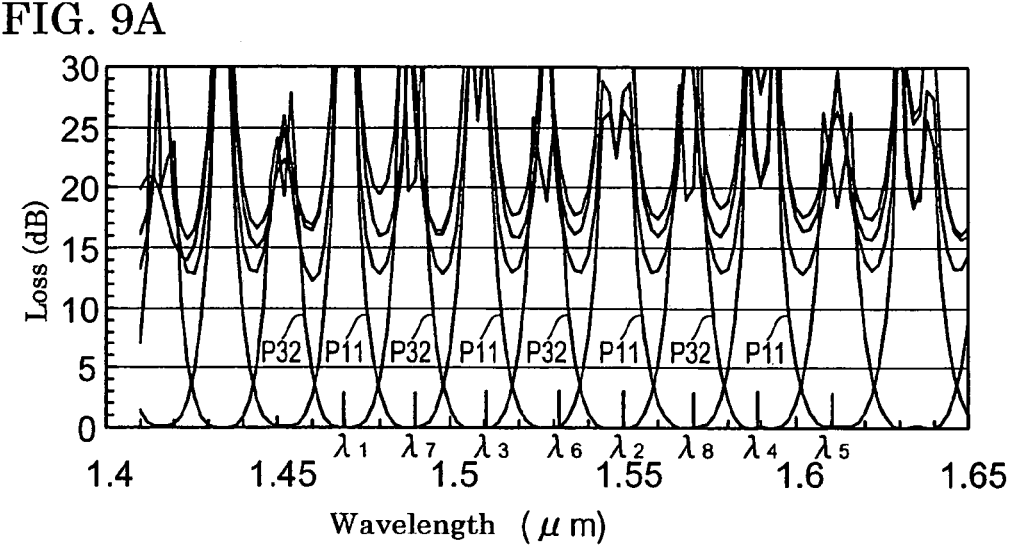
FIGS. 9A and 9B are graphs illustrating an example of the transmission spectrum of light traveling from an input port P33 to the output port P11 or P32 in the lightwave circuit device of the fourth embodiment, with FIG. 9A being when a switch is set to output the signal light S3 to the output port P11, and FIG. 9B being when the switch is set to output the signal light S1 to the output port P11.
Figure 9B:
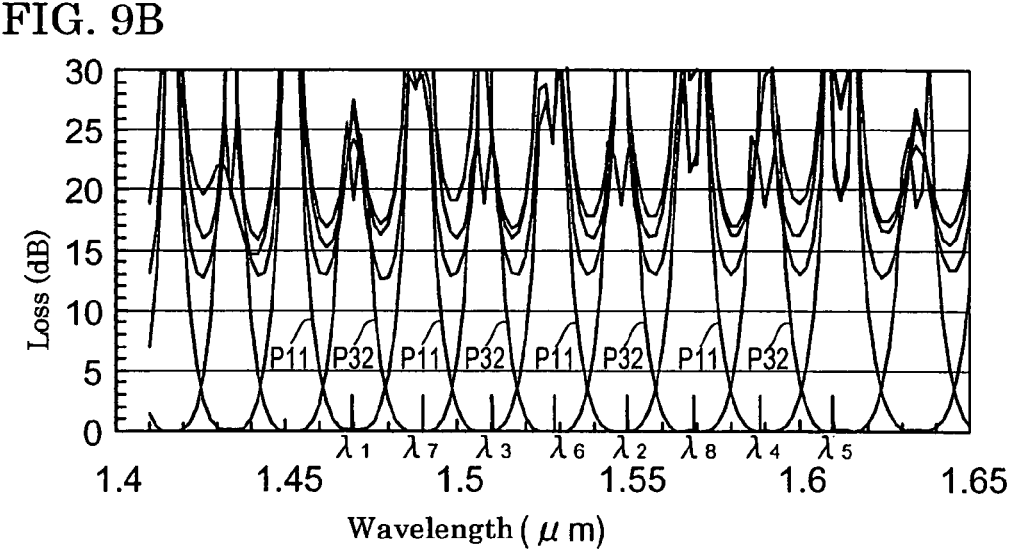

A specific example of the lightwave circuit device 10c will now be described. FIGS. 9A and 9B are graphs illustrating an example of the transmission spectrum of light traveling from the input port P33 to the output port P11 or P32 in the lightwave circuit device of the fourth embodiment. The horizontal axis of the graph indicates the wavelength of the light, while the vertical axis indicates the loss (dB). In this example, the wavelengths $\lambda_1$, $\lambda_2$, $\lambda_3$, $\lambda_4$, $\lambda_5$, $\lambda_6$, $\lambda_7$, and $\lambda_8$ are 1470 nm, 1550 nm, 1510 nm, 1590 nm, 1610 nm, 1530 nm, 1490 nm, and 1570 nm. The optical waveguide parameters and the lightwave circuit parameters are the same as in the first embodiment.

FIG. 9A illustrates when a switch is set such that the signal light S3 is outputted to the output port P11. The spectrum indicated as P11 is the loss spectrum of light traveling from the input port P33 to the output port P11, and the spectrum indicated as P32 is the loss spectrum of light traveling from the output port P33 to the output port P32.

With the lightwave circuit device 10c, for example, the heaters H1 to H5, H11, H21, H31, H41, and H51 are used to control the phase differential $\phi_1$ to be $-45°$, the phase differential $\phi_2$ to be $-22.5°$, the phase differential $\phi_3$ to be $-22.5°$, the phase differential $\phi_4$ to be $90°$, and the phase differential $\phi_5$ to be $-180°$. With the spectrum P11, the loss is the minimum at the wavelengths $\lambda_5$, $\lambda_6$, $\lambda_7$, and $\lambda_8$, and lightwaves having the wavelengths $\lambda_5$, $\lambda_6$, $\lambda_7$, and $\lambda_8$ are outputted from the output port P11. With the spectrum P32, the loss is the minimum at the wavelengths $\lambda_1$, $\lambda_2$, $\lambda_3$, and $\lambda_4$, and lightwaves having the wavelengths $\lambda_1$, $\lambda_2$, $\lambda_3$, and $\lambda_4$ are outputted from the output port P32.

FIG. 9B illustrates when the switch is set such that signal light S1 is outputted to the output port P11. The spectrum indicated as P11 is the spectrum of light traveling from the input port P34 to the output port P11, and the spectrum indicated as P32 is the spectrum of light traveling from the input port P34 to the output port P32.

With the lightwave circuit device 10c, the phase differential $\phi_1$ is controlled to be $45°$, the phase differential $\phi_2$ to be $22.5°$, the phase differential $\phi_3$ to be $22.5°$, the phase differential $\phi_4$ to be $-90°$, and the phase differential $\phi_5$ to be $180°$. With the spectrum P11, the loss is the minimum at the wavelengths $\lambda_1$, $\lambda_2$, $\lambda_3$, and $\lambda_4$, and lightwaves having the wavelengths $\lambda_1$, $\lambda_2$, $\lambda_3$, and $\lambda_4$ are outputted from the output port P11. With the spectrum P32, the loss is the minimum at the wavelengths $\lambda_5$, $\lambda_6$, $\lambda_7$, and $\lambda_8$, and lightwaves having the wavelengths $\lambda_5$, $\lambda_6$, $\lambda_7$, and $\lambda_8$ are outputted from the output port P32.

As discussed above, when the optical switch SW is used, either the signal light S1 or S3 can be selectively inputted to the optical demultiplexing circuit 30 and demultiplexed.

Optical Add/Drop Apparatus and Wavelength Multiplexing Transmission System

Figure 10:
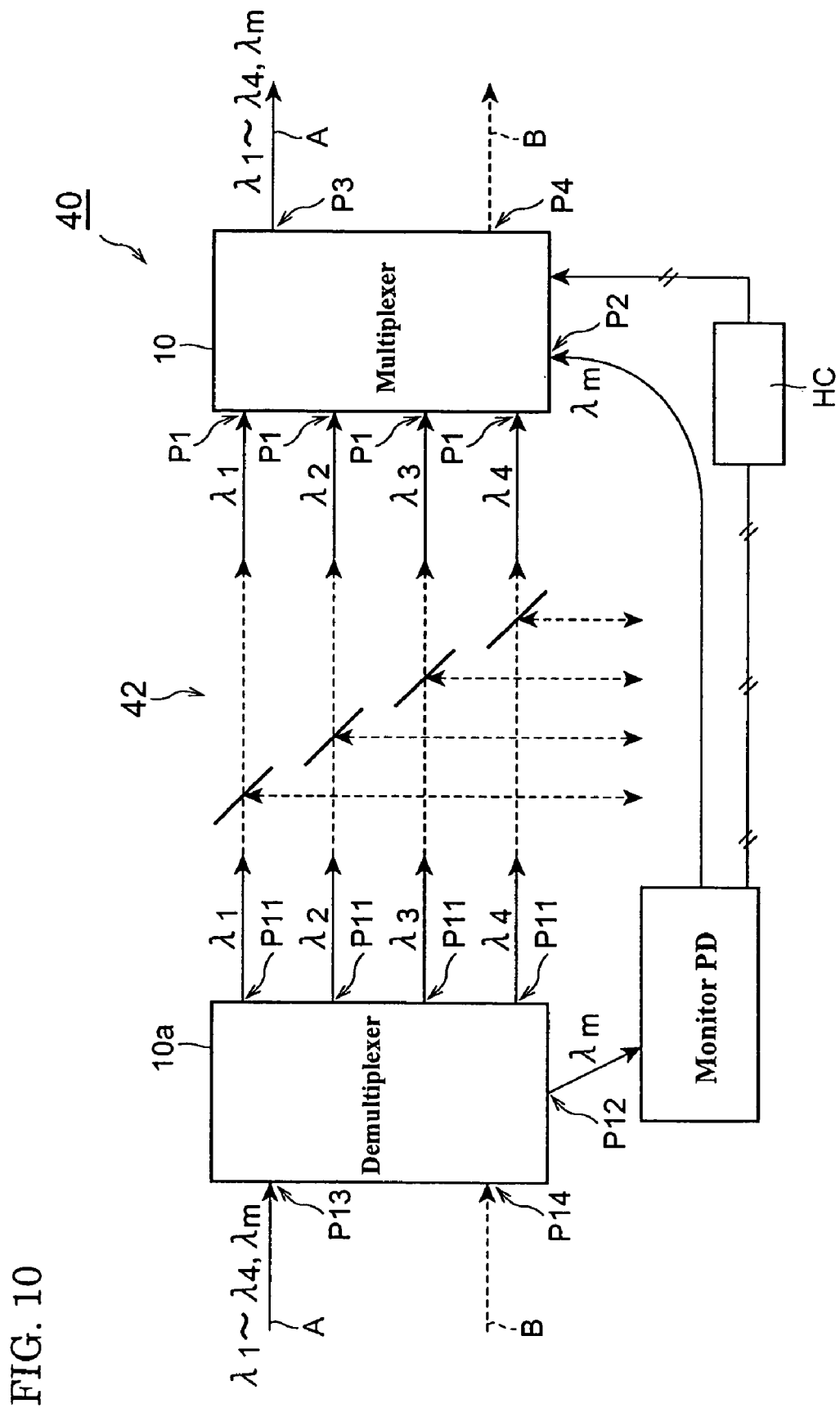
FIG. 10 is a block diagram of an optical add/drop apparatus equipped with the lightwave circuit device of the first embodiment and the lightwave circuit device of the second embodiment.

FIG. 10 is a block diagram of an optical add/drop apparatus equipped with the lightwave circuit device 10 of the first embodiment and the lightwave circuit device 10a of the second embodiment. A transmission path A, which is used ordinarily, and a transmission path B, which is used as a back-up, are respectively connected to the input ports P13 and P14, of the lightwave circuit device 10a. The transmission paths A and B are also respectively connected to the output ports P3 and P4, of the lightwave circuit device 10. The transmission paths A and B constitute a cable having two optical fibers, for example. Ordinarily, the monitoring light having a wavelength of $\lambda_m$ and the first signal light S1, in which a plurality of lightwaves having different wavelengths of $\lambda_1$, $\lambda_2$, $\lambda_3$, and $\lambda_4$ are multiplexed, pass through the transmission path A.

First, the first signal light S1 and the monitoring light are inputted to the input port P13 of the lightwave circuit device 10a, and demultiplexed by the lightwave circuit device 10a. Lightwaves having the wavelengths $\lambda_1$, $\lambda_2$, $\lambda_3$, and $\lambda_4$ are outputted from the plurality of output ports P11. Meanwhile, the monitoring light having a wavelength $\lambda_m$ is outputted from the output port P12 of the lightwave circuit device 10a, and inputted to a monitor photo diode (PD). Each lightwave is then passed through an add/drop through component 42, and then inputted to the plurality of input ports P1 of the lightwave circuit device 10. With this lightwave circuit device 10, the lightwaves are multiplexed and become the first signal light S1. The monitoring light is used for determining light-receiving level by the monitor PD, outputted from a monitoring light-use laser diode (LD) (not shown), and inputted to the input port P2 of the lightwave circuit device 10. After this, the first signal light S1 and the monitoring light are multiplexed and then outputted from the output port P3 of the lightwave circuit device 10.

If there should be some kind of obstruction in the transmission path A, and the transmission path A is no longer able to transmit the first signal light S1 and the monitoring light, the monitoring light will not reach the monitor PD. As a result, the obstruction in the transmission path A will be detected. If this happens, first a control unit HC controls the heaters H4, H41, H5, and H51 of the lightwave circuit device 10 based on the electrical signals from the monitor PD, and changes the phase differentials $\phi_4$ and $\phi_5$ of the lightwave circuit device 10, shifting from the state shown in FIG. 4A to the state shown in FIG. 4B. As a result, the first signal light S1 and the monitoring light pass through the transmission path B.

Figures 11A, 11B:
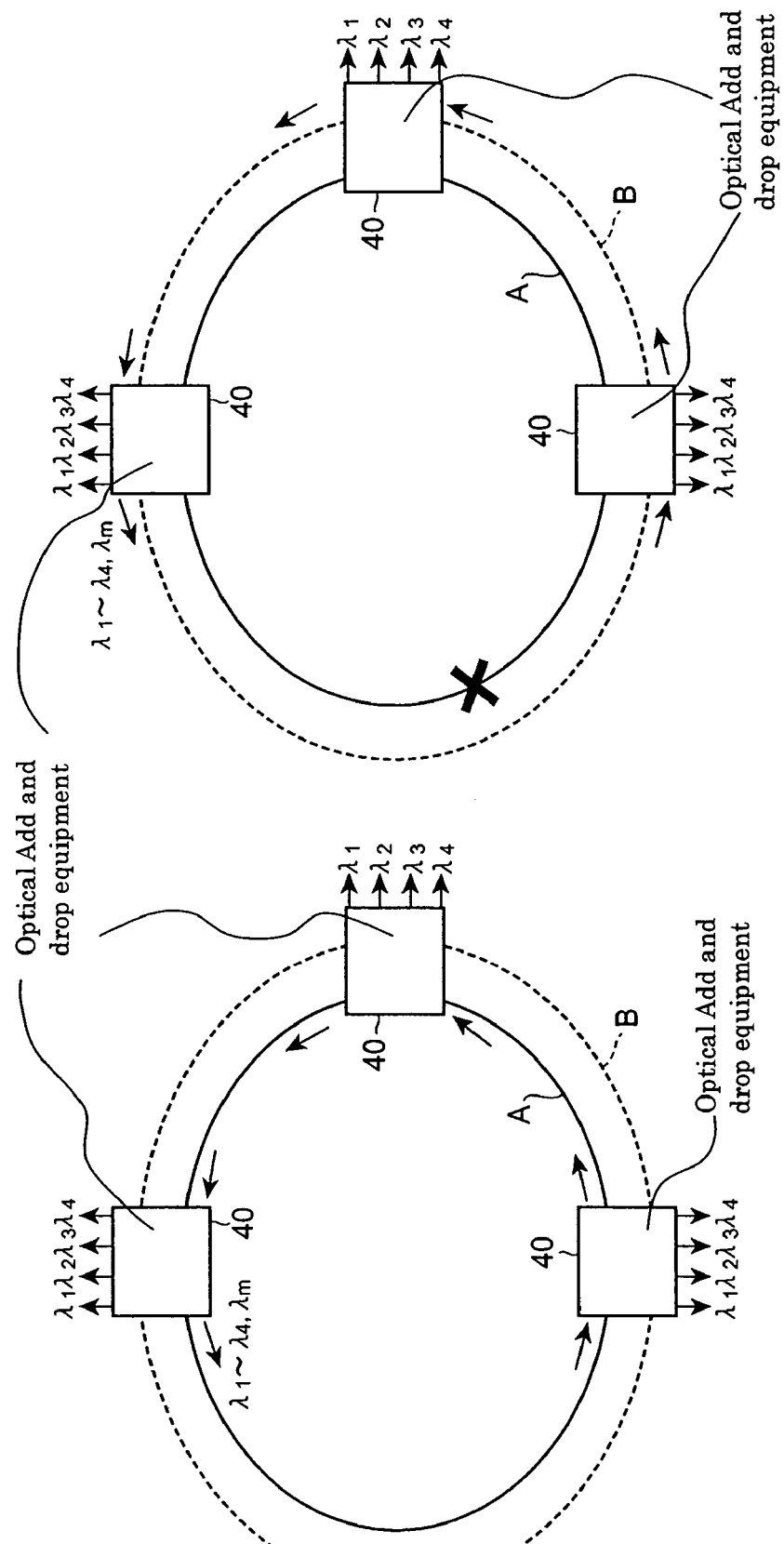
FIGS. 11A and 11B are block diagrams of a wavelength division multiplexing transmission system equipped with a plurality of the optical add/drop apparatus of FIG. 10, with FIG. 11A being when the transmission path A is operating normally, and FIG. 11B being when an obstruction has occurred in the transmission path A.

FIGS. 11A and 11B are block diagrams of a wavelength multiplexing transmission system equipped with a plurality of the optical add/drop apparatus of FIG. 10. FIG. 11A illustrates the case when the transmission path A is operating normally, and FIG. 11B when an obstruction has occurred in the transmission path A. In this example, three optical add/drop apparatus 40 are connected in an annular shape via the transmission paths A and B. In the state in FIG. 11A, the first signal light S1 and the monitoring light having a wavelength $\lambda_m$ are passing through the transmission path A. When an obstruction in the transmission path A is detected, the optical add/drop apparatus 40 are controlled such that the first signal light S1 and the monitoring light will pass through the transmission path B.

Figure 12:
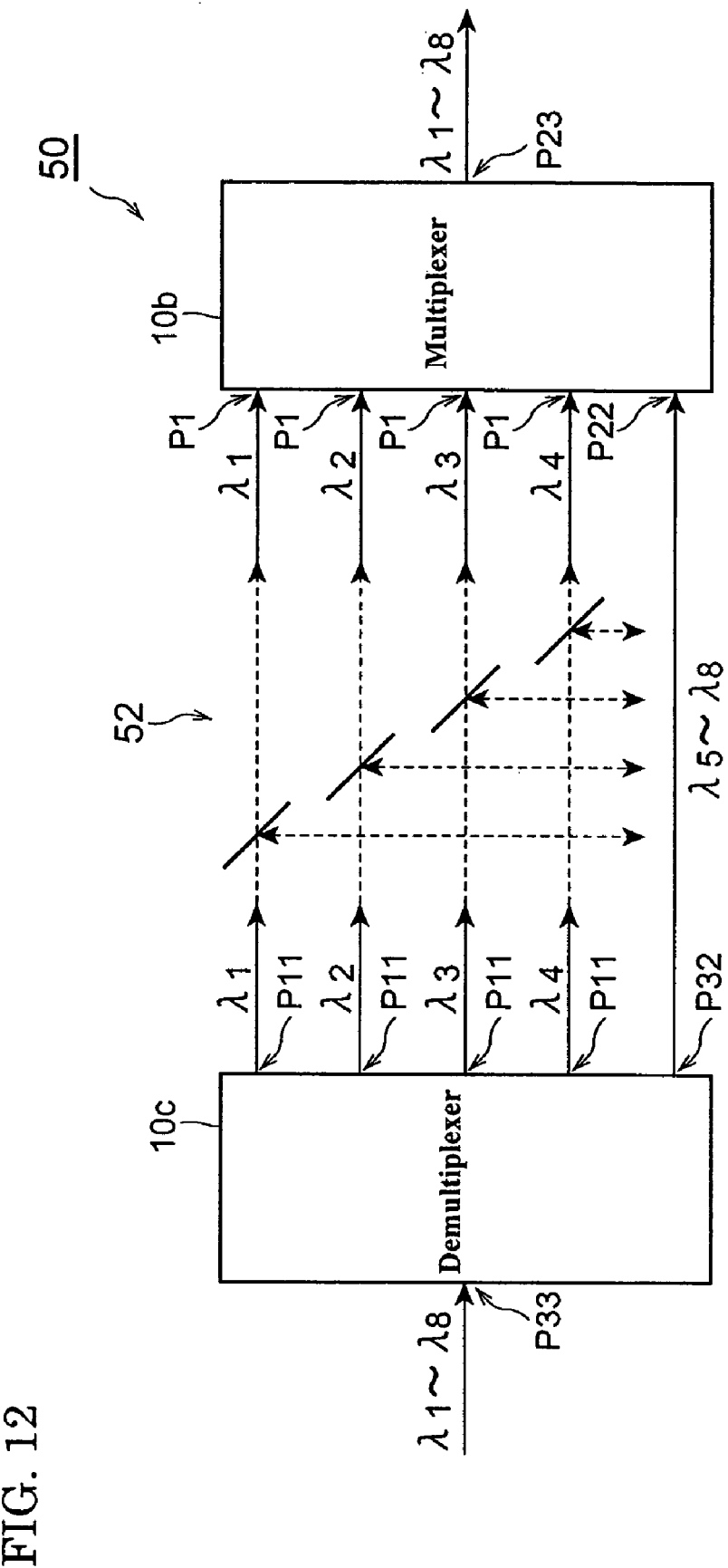
FIG. 12 is a block diagram of an optical add/drop apparatus equipped with the lightwave circuit device of the third embodiment and the lightwave circuit device of the fourth embodiment.

FIG. 12 is a block diagram of an optical add/drop apparatus 50 equipped with the lightwave circuit device 10b of the third embodiment and the lightwave circuit device 10c of the fourth embodiment. Lightwaves having mutually different wavelengths $\lambda_1$ to $\lambda_8$ are inputted to the input port P33 of the lightwave circuit device 10c, and of these plurality of lightwaves, those having the wavelengths $\lambda_1$, $\lambda_2$, $\lambda_3$, and $\lambda_4$ are demultiplexed by the lightwave circuit device 10c. As a result, lightwaves having the wavelengths $\lambda_1$, $\lambda_2$, $\lambda_3$, and $\lambda_4$ are outputted from the plurality of output ports P11. These lightwaves pass through an add/drop through component 52, after which they are inputted to the plurality of input ports P1 of the lightwave circuit device 10b. Meanwhile, the lightwaves having the wavelengths $\lambda_5$, $\lambda_6$, $\lambda_7$, and $\lambda_8$ are outputted from the output port P32 of the lightwave circuit device 10c and inputted to the input port P22 of the lightwave circuit device 10b. the lightwaves having the wavelengths $\lambda_1$, $\lambda_2$, $\lambda_3$, and $\lambda_4$ are multiplexed by this lightwave circuit device 10b. Further, lightwaves having wavelengths of $\lambda_5$, $\lambda_6$, $\lambda_7$, and $\lambda_8$ are multiplexed with the above lightwaves, and the lightwaves $\lambda_1$ to $\lambda_8$ are outputted to the output port P23 of the lightwave circuit device 10b.

Here, it is also possible to control the heaters of the lightwave circuit devices 10b and 10c so that lightwaves having the wavelengths of $\lambda_5$, $\lambda_6$, $\lambda_7$, and $\lambda_8$ pass through the add/drop through component 52. In this case, these lightwaves are outputted from the output ports P11 of the lightwave circuit device 10c and pass through the add/drop through component 52, after which they are separately inputted to the input ports P1 of the lightwave circuit device 10b. Meanwhile, lightwaves having the wavelengths of $\lambda_1$, $\lambda_2$, $\lambda_3$, and $\lambda_4$ are outputted from the output port P32 of the lightwave circuit device 10c and inputted to the input port P22 of the lightwave circuit device 10b.

Figure 13:
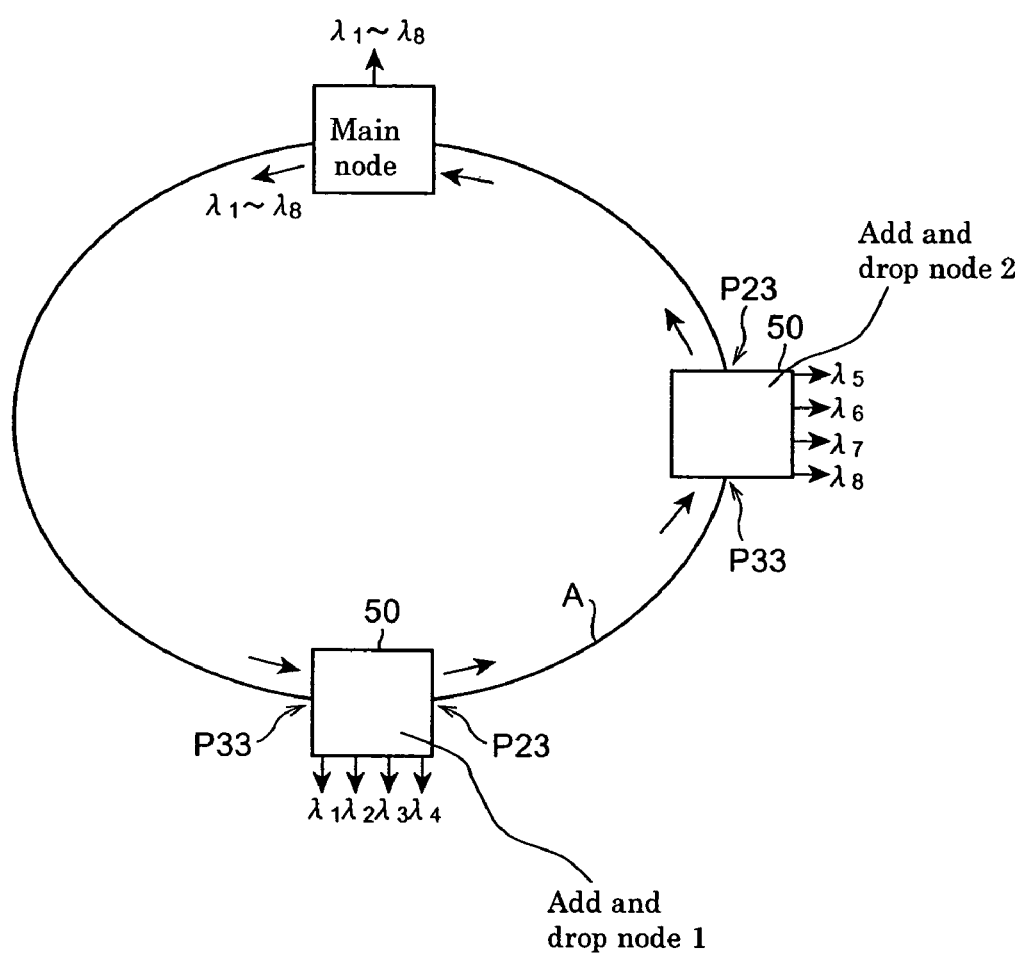
FIG. 13 is a block diagram of a wavelength division multiplexing transmission system equipped with a plurality of the optical add/drop apparatus of FIG. 12.

FIG. 13 is a block diagram of a wavelength multiplexing transmission system equipped with a plurality of the optical add/drop apparatus of FIG. 12. In this example, an add/drop node 1, an add/drop node 2, and a main node are connected in an annular shape via the transmission path A. The above-mentioned optical add/drop apparatus 50 is used as the add/drop node 1 and the add/drop node 2. In the add/drop node 1, lightwaves having the wavelengths $\lambda_1$, $\lambda_2$, $\lambda_3$, and $\lambda_4$ pass through the add/drop through component 52, while lightwaves having the wavelengths $\lambda_5$, $\lambda_6$, $\lambda_7$, and $\lambda_8$ are outputted from the output port P32 and inputted to the input port P22. In the add/drop node 2, lightwaves having the wavelengths $\lambda_5$, $\lambda_6$, $\lambda_7$, and $\lambda_8$ pass through the add/drop through component 52, while lightwaves having the wavelengths $\lambda_1$, $\lambda_2$, $\lambda_3$, and $\lambda_4$ are outputted from the output port P32 and inputted to the input port P22. Either the lightwaves having the wavelengths $\lambda_1$, $\lambda_2$, $\lambda_3$, and $\lambda_4$ or the lightwaves having the wavelengths $\lambda_5$, $\lambda_6$, $\lambda_7$, and $\lambda_8$ can be selectively outputted from the transmission path A by controlling the heaters of the lightwave circuit devices 10b and 10c.

With a conventional wavelength multiplexing transmission system, a spare optical add/drop apparatus is usually provided only in case the main. optical add/drop apparatus should break down. Also, a conventional optical add/drop apparatus is designed so that only one type of lightwave passes through the add/drop through component. Consequently, if different lightwaves are to pass through the add/drop through components of two optical add/drop apparatus, for example, two types of optical add/drop apparatus have to be provided. However, when the above-mentioned optical add/drop apparatus 50 is used, the lightwaves that pass through the add/drop through component can be changed by controlling the heaters. Accordingly, with a wavelength multiplexing transmission system equipped with the optical add/drop apparatus 50, only one type of optical add/drop apparatus need be provided as a spare.

While this invention is described in connection with what is presently considered to be the most practical and preferred embodiments, the invention is not limited to the disclosed embodiments, but on the contrary, is intended to cover various modifications and equivalent arrangements included within the spirit and scope of the appended claims.

For instance, the number of Mach-Zehnder interferometers in the optical multiplexing circuit or optical demultiplexing circuit is not limited to three. Mach-Zehnder interferometers can be connected in the form of an n-stage tree (where n is a natural number). In this case, the number of Mach-Zehnder interferometers is $2^n-1$, that is, it is $(1+2+2^2+\ldots+2^{n-1})$. The number of the plurality of input ports P1 is $2^n$. The lightwave circuit device 10 of the optical module 1 can also be substituted with the lightwave circuit device 10a, lightwave circuit device 10b, or lightwave circuit device 10c.

The entire disclosure of Japanese Patent Application No. 2004-173093 filed on Jun. 10, 2004, including specification, claims, drawings, and summary are incorporated herein by reference in its entirety.

What is claimed is:

1. A lightwave circuit device comprising first to third Mach-Zehnder interferometers and an optical switch,
   wherein the first to third Mach-Zehnder interferometers each comprise first to third ports, a first optical coupler whose one end is optically coupled to the first port, first and second optical waveguides optically coupled to the other end of the first optical coupler, a second optical coupler optically coupled to the first and the second optical waveguides and the second and the third ports, and a first heater provided along at least one of the first and the second optical waveguides,
   the second port of the first Mach-Zehnder interferometer and the first port of the second Mach-Zehnder interferometer are optically coupled, and
   the third port of the first Mach-Zehnder interferometer and the first port of the third Mach-Zehnder interferometer are optically coupled, and
   the optical switch comprising:
      a third optical coupler whose one end is optically coupled to the first port of the first Mach-Zehnder interferometer;
      third and fourth optical waveguides optically coupled to the other end of the third optical coupler;
      a fourth optical coupler whose one end is optically coupled to the third and the fourth optical waveguides;
      fifth and sixth optical waveguides optically coupled to the other end of the fourth optical coupler;
      a fifth optical coupler whose one end is optically coupled to the fifth and the sixth optical waveguides;
      a second heater provided along at least one of the third and the fourth optical waveguides; and
      a third heater provided along at least one of the fifth and the sixth optical waveguides.

2. The lightwave circuit device according to claim 1, further comprising a fourth port optically coupled to one end of the third optical coupler.

3. An optical multiplexer in which a plurality of first input ports to which a plurality of lightwaves of mutually different wavelengths are inputted, an optical multiplexing circuit that multiplexes the plurality of lightwaves and outputs a first signal light, a second input port to which a second signal light including a lightwave with a wavelength different from that of the plurality of lightwaves is inputted, an optical switch to which the first signal light and the second signal light are inputted and an output port to which the first and the second signal lights are outputted, are provided on a substrate,
   wherein the optical multiplexing circuit comprises first to third Mach-Zehnder interferometers, each of the Mach-Zehnder interferometers having first to third ports, a first optical coupler whose one end is optically coupled to the first port, first and second optical waveguides optically coupled to the other end of the first optical coupler, a second optical coupler optically coupled to the first and the second optical waveguides the second and the third ports, and a heater provided along at least one of the first and the second optical waveguides,
   the second port of the first Mach-Zehnder interferometer and the first port of the second Mach-Zehnder interferometer are optically coupled,
   the third port of the first Mach-Zehnder interferometer and the first port of the third Mach-Zehnder interferometer are optically coupled, and
   the second and the third ports of each of the second and the third Mach-Zehnder interferometers are optically coupled to the plurality of first input ports, and
   the optical switch comprising:
      a third optical coupler whose one end is optically coupled to the first port of the first Mach-Zehnder interferometer;
      third and fourth optical waveguides optically coupled to the other end of the third optical coupler;
      a fourth optical coupler whose one end is optically coupled to the third and the fourth optical waveguides;
      fifth and sixth optical waveguides optically coupled to the other end of the fourth optical coupler;
      a fifth optical coupler whose one end is optically coupled to the fifth and the sixth optical waveguides;
      a second heater provided along at least one of the third and the fourth optical waveguides; and
      a third heater provided along at least one of the fifth and the sixth optical waveguides.

4. An optical demultiplexer in which an input port to which a first signal light including a plurality of lightwaves of mutually different wavelengths and a second signal light including a lightwave with a wavelength different from those of the plurality of lightwaves are inputted, an optical switch outputting the first signal light and the second signal light, an optical demultiplexing circuit that demultiplexes the first signal light, a first output port to which the second signal light is outputted, and a plurality of second output ports to which the plurality of lightwaves included in the first signal light and demultiplexed by the optical demultiplexing circuit are outputted, are provided on a substrate,
   wherein the optical demultiplexing circuit comprises first to third Mach-Zehnder interferometers, each of the Mach-Zehnder interferometers having first to third ports, a first optical coupler whose one end is optically coupled to the first port, first and second optical waveguides optically coupled to the other end of the first optical coupler, a second optical coupler optically coupled to the first and the second optical waveguides and the second and the third ports, and a heater provided along at least one of the first and the second optical waveguides,
   the second port of the first Mach-Zehnder interferometer and the first port of the second Mach-Zehnder interferometer are optically coupled,
   the third port of the first Mach-Zehnder interferometer and the first port of the third Mach-Zehnder interferometer are optically coupled, and
   the second and the third ports of each of the second and the third Mach-Zehnder interferometers are optically coupled to the plurality of second output ports and the optical switch comprising:
      a third optical coupler whose one end is optically coupled to the first port of the first Mach-Zehnder interferometer;
      third and fourth optical waveguides optically coupled to the other end of the third optical coupler;

a fourth optical coupler whose one end is optically coupled to the third and the fourth optical waveguides;

fifth and sixth optical waveguides optically coupled to the other end of the fourth optical coupler;

a fifth optical coupler whose one end is optically coupled to the fifth and the sixth optical waveguides;

a second heater provided along at least one of the third and the fourth optical waveguides; and a third heater provided along at least one of the fifth and the sixth optical waveguides.

* * * * *